(12) United States Patent
Sodagar (10) Patent No.: US 12,425,544 B2
(45) Date of Patent: Sep. 23, 2025

(54) SESSION DESCRIPTION PROTOCOL (SDP) SIGNALING OF OCCLUDE-FREE REGIONS IN 360 VIDEO CONFERENCING

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 302 days.

(21) Appl. No.: 18/073,207

(22) Filed: Dec. 1, 2022

(65) Prior Publication Data

US 2023/0254447 A1 Aug. 10, 2023

Related U.S. Application Data

(60) Provisional application No. 63/307,550, filed on Feb. 7, 2022.

(51) Int. Cl.
| | |
|---|---|
| *H04N 7/15* | (2006.01) |
| *H04L 12/18* | (2006.01) |
| *H04N 7/14* | (2006.01) |
| *H04N 23/698* | (2023.01) |

(52) U.S. Cl.
CPC ......... *H04N 7/152* (2013.01); *H04L 12/1822* (2013.01); *H04N 7/147* (2013.01); *H04N 23/698* (2023.01)

(58) Field of Classification Search
CPC ....... H04N 7/152; H04N 23/698; H04N 7/147
See application file for complete search history.

(56) References Cited

U.S. PATENT DOCUMENTS

| | | | |
|---|---|---|---|
| 2017/0270633 A1* | 9/2017 | Riley | ...................... G06T 15/20 |
| 2018/0336702 A1* | 11/2018 | Cricri | ...................... G06V 40/40 |
| 2020/0250891 A1 | 8/2020 | Curcio et al. | |
| 2020/0374505 A1 | 11/2020 | Kammachi Sreedhar et al. | |

(Continued)

OTHER PUBLICATIONS

3GPP TS 26.114 V17.2.0, 3rd Generation Partnership Project; Technical Specification Group Services and System Aspects; IP Multimedia Subsystem (IMS); Multimedia Telephony; Media handling and interaction (release 17), Sep. 2021, pp. 1-471.

(Continued)

*Primary Examiner* — Duc Nguyen
*Assistant Examiner* — Carissa A Jones
(74) *Attorney, Agent, or Firm* — Sughrue Mion, PLLC (57) ABSTRACT

A including receiving a first video input corresponding to a 360-degree video; receiving one or more second video inputs; defining one or more occlude-free regions in the first video input, each occlude-free region indicating an area of the video that is not overlayed by another image or video; signaling location information of the one or more occlude-free regions in a session description protocol (SDP) via a 3rd Generation Partnership Project (3GPP) overlay attribute, wherein the 3GPP overlay attribute signals whether a respective 3GPP overlay is intended for a occlude-free area or dedicated to a specific overlay; transmitting the SDP to a receiver; and rendering an output video that includes the first video input with the one or more second video inputs overlaid in a region not including the one or more occlude free regions.

20 Claims, 5 Drawing Sheets

(56) References Cited

U.S. PATENT DOCUMENTS

2021/0392293 A1    12/2021    Abhishek et al.
2023/0140042 A1*    5/2023    Sodagar ............... H04N 23/698
                                                            348/14.09

OTHER PUBLICATIONS

International Search Report dated Apr. 17, 2023 in Application No. PCT/US22/52640.
Written Opinion of the International Searching Authority dated Apr. 17, 2023 in Application No. PCT/US22/52640.
Communication dated Apr. 7, 2025 issued by the European Patent Office in application No. 22925206.9.
MTSI SWG Chairman, " MTSI SWG Report during SA4#116-e", 3GPP TSG SA WG4#116-e meeting, Nov. 10-19, 2021, Tdoc S4-211606, pp. 1-28.
Tencent Cloud, "[ITT4RT] Occlude-free scene description", 3GPP TSG 3GPPSA4#116-e, Nov. 10-19, 2021, S4-211420, 2 pages total.
Tencent, "[ITT4RT] Requirement for occlude-free areas in 360 video", 3GPP SA4#1166-e, Nov. 10-19, 2021, S4-211611, 4 pages total.
Nokia Corporation, et al . . . , "CR on ITT4RT Phase 2 Features", 3GPP TSG SA WG4 Meeting #117e, Feb. 14-23, 2022, Online, S4-220263, 35 pages total.
Nokia Corporation, et al., "Changes to TS 26.114 for External source or occlusion-free overlays", 3GPP TSG SA WG4 117-e meeting, Feb. 14-23, 2022, online, S4-220162, 5 pages total.
"Universal Mobile Telecommunications System (UMTS); LTS; 5G; IP Multimedia Subsystem (IMS); Multimedia telephony; Media handling and interaction (3GPP TS 26.114 version 17.4.0 Release 17)", ETSI Technical Specification, European Telecommunications Standards Institute (ETSI), vol. 3GPP SA, No. V17.4.0, Apr. 2022, pp. 1-490 (491 pages total).

* cited by examiner

SESSION DESCRIPTION PROTOCOL (SDP) SIGNALING OF OCCLUDE-FREE REGIONS IN 360 VIDEO CONFERENCING

CROSS-REFERENCE TO RELATED APPLICATION

This application is based on and claims priority to U.S. Patent Application No. 63/307,550, filed on Feb. 7, 2022, the disclosure of which is incorporated herein by reference in its entirety.

TECHNICAL FIELD

The present disclosure provides a method to signal occlude-free regions in 360 video conferencing using Session Description Protocol (SDP). An occlude-free region in a 360 video is a region of the 360-video that should not be covered by any overlays since it contains important information.

BACKGROUND

3rd Generation Partnership Project (3GPP) TS26.114 defines a video conferencing system for mobile handsets. In its new release, the specification supports video conferencing with the terminals that support capturing and transmitting 360 videos. The standard also supports adding overlays to 360 videos. The 360 video and its overlays may get rendered together with the other 2-d videos from other remote participants in the conference call.

The current 5G media streaming architecture defined in 3GPP TS26.114 provides the general framework for video conferencing over mobile networks. A remote participant such as a user B receives a 360 video from a room A and a 2-d video from a user C. The user may want to see both videos on his/her terminal. However, if the user wants to take the most advantage of the device display, room A's 360-video may need to take the entire screen of user B's device, and then, the 2-d video from user C must be overlaid on top of room A's 360-video.

The current standard doesn't define any method for signaling the room A occlude-free regions. Those regions are the regions of 360 video of room A that should have important information (the participants in the room, or presentation display) and should not be occluded by overlaying video from other users (such as user C's 2-D video) in a receiving remote terminal.

SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

This disclosure provides a method for signaling occlude-free regions.

According to some embodiments, there is provided a method performed by at least one processor. The method includes receiving a first video input corresponding to a 360-degree video. The method further includes receiving one or more second video inputs. The method further includes defining one or more occlude-free regions in the first video input, each occlude-free region indicating an area of the video that is not overlayed by another image or video. The method further includes signaling location information of the one or more occlude-free regions in a session description protocol (SDP) via a 3GPP overlay attribute, wherein the 3GPP overlay attribute signals whether a respective 3GPP overlay is intended for a occlude-free area or dedicated to a specific overlay. The method further includes transmitting the SDP to a receiver; and rendering an output video that includes the first video input with the one or more second video inputs overlaid in a region not including the one or more occlude free regions.

According to some embodiments, an apparatus includes at least one memory configured to store program code and at least one processor configured to read the program code and operate as instructed by the program code. The program code includes first receiving code configured to cause the at least one processor to receive a first video input corresponding to a 360-degree video. The program coder further includes second receiving code configured to cause the at least one processor to receive one or more second video inputs. The program coder further includes defining code configured to cause the at least one processor to define one or more occlude-free regions in the first video input, each occlude-free region indicating an area of the video that is not overlayed by another image or video. The program coder further includes signaling code configured to cause the at least one processor to signal location information of the one or more occlude-free regions in a session description protocol (SDP) via a 3GPP overlay attribute, wherein the 3GPP overlay attribute signals whether a respective 3GPP overlay is intended for a occlude-free area or dedicated to a specific overlay. The program coder further includes transmitting code configured to cause the at least one processor to transmit the SDP to a receiver. The program coder further includes rendering code configured to cause the at least one processor to render an output video that includes the first video input with the one or more second video inputs overlaid in a region not including the one or more occlude free regions.

According to some embodiments, a non-transitory computer-readable storage medium, stores instructions that, when executed by at least one processor, cause the at least one processor to receive a first video input corresponding to a 360-degree video. The instructions further cause the at least one processor to receive one or more second video inputs. The instructions further cause the at least one processor to define one or more occlude-free regions in the first video input, each occlude-free region indicating an area of the video that is not overlayed by another image or video. The instructions further cause the at least one processor to signal location information of the one or more occlude-free regions in a session description protocol (SDP) via a 3GPP overlay attribute, wherein the 3GPP overlay attribute signals whether a respective 3GPP overlay is intended for a occlude-free area or dedicated to a specific overlay. The instructions further cause the at least one processor to transmit the SDP to a receiver. The instructions further cause the at least one processor to render an output video that includes the first video input with the one or more second video inputs overlaid in a region not including the one or more occlude free regions.

Additional embodiments will be set forth in the description that follows and, in part, will be apparent from the description, and/or may be learned by practice of the presented embodiments of the disclosure.

BRIEF DESCRIPTION OF THE DRAWINGS

The above and other features and aspects of embodiments of the disclosure will be apparent from the following description taken in conjunction with the accompanying drawings, in which.

DETAILED DESCRIPTION OF THE INVENTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

When using conventional methods for video conferencing with a 360 video, the current systems rely on transcribing a 360 video to 2-dimensional space and overlaying the 2-d drawing with other pertinent information. For example, when a user is in a 360 conference with some sort of presentation, the current systems need to choose to either display the conference (360 video), the presentation (2D video) or some sort of overlapped rendering of the conference video with the presentation drawn over part of the conference. Due to the increased occurrence of remote work, the need for collaboration between peers requires a better way to see both the participants and the subject matter of the virtual meetings.

The disclosure describes the regions of interest in a 360 video that are tagged as occlude-free areas. The location and the area of each region are transferred to the receivers so that each receiver knows those areas are supposed to be kept occlude-free during the rendering with videos and images from other terminals. For instance, each participant's face in the conference room could be one region of interest in a 360 video of that conference room.

These regions of interest are dynamic and may change during a video conferencing session. For instance, a new participant may join in the conference room, and/or someone else leaves the conference room. Therefore, the number and/or size of occlude-free regions may change during the video conference session.

In some embodiments, a global coordinate system of the 360-video as the reference for any occlude-free region is used. An occlude-free region is defined by its location in that coordinate system and its area in that coordinate system. For instance, a spherical rectangular area is defined by its center, and its yaw and pitch range around the center. Similarly, in various coordinate systems, a region can be defined using the parameters of that coordinate system.

In some embodiments, an occlude-free area of a 360 video can be signaled in the SDP via 3gpp_overlay attribute. Adding an additional flag makes it possible to signal whether the decided 3GPP overlay is intended for a occlude-free area or whether it is dedicated to a specific overlay. For example:

a=3gpp_overlay: overlay_id SP type SP (sphere_relative_overlay_config/viewport_relative_overlay_config) [SP overlay_info][for_additional_overlays]

The for_additional_overlay flag has the following semantics:

1. If the for_additional_overlay flag is not included or set to 0, then this overlay has a dedicated media that is identified with the overlay_id value.
2. If for_additional_overlay is included and set to 1, then this overlay is an occlude-free overlay and the receiver can use this for overlaying any media that is desired. This overlay would not result in the loss of any significant information as this region is specifically marked as an occlude-free region.

The SDP may include one or more of the above announcements, each representing one occlude-free region. Furthermore, using the SDP, the regions can be updated, removed or new regions can be added during the session by offering new SDP lines during the session.

By defining a clear map of occlude-free areas using SDP, the receiving terminal knows not to render any overlays on those areas. The number, location, and size of each occlude-free region can be updated during the session. This information can be extracted at the source and then delivered from the source or it can be added at the MRF.

Figure 1:
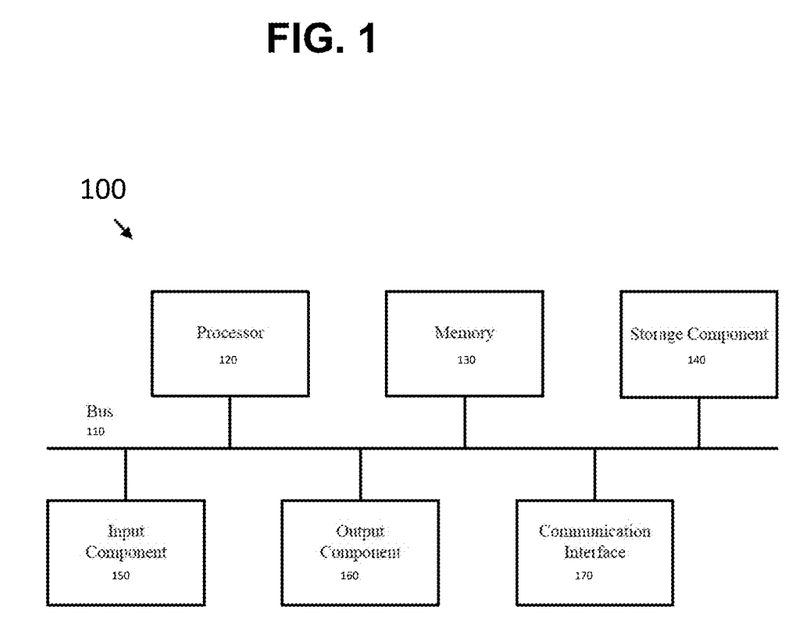
FIG. 1 is a diagram of an example network device, in accordance with various embodiments of the present disclosure.

FIG. 1 illustrates an exemplary system 100 of an embodiment for using the 360 video conferencing method. The exemplary system 100, may be one of a variety of systems such as a personal computer, a mobile device, a cluster of computers, a server, embedded device, ASIC, microcontroller, or any other device capable of running code. Bus 110 connects the exemplary system 100 together such that all the components may communication with one another. The bus 110 connects the processor 120, the memory 130, the storage component 140, the input component 150, the output component 160 and the interface component.

The processor 120 may be a single processor, a processor with multiple processors inside, a cluster (more than one) of processors, and/or a distributed processing. The processor carries out the instructions stored in both the memory 130 and the storage component 140. The processor 120 operates as the computational device, carrying out operations for the text normalization apparatus. Memory 130 is fast storage and retrieval to any of the memory devices may be enabled through the use of cache memory, which may be closely associated with one or more CPU. Storage component 140 may be one of any longer term storage such as a HDD, SSD, magnetic tape or any other long term storage format.

Input component 150 may be any file type or signal from a user interface component such as a camera or text capturing equipment. Output component 160 outputs the processed information to the communication interface 170. The communication interface may be a speaker or other communication device, which may display information to a user or another observer such as another computing system.

Figure 2:
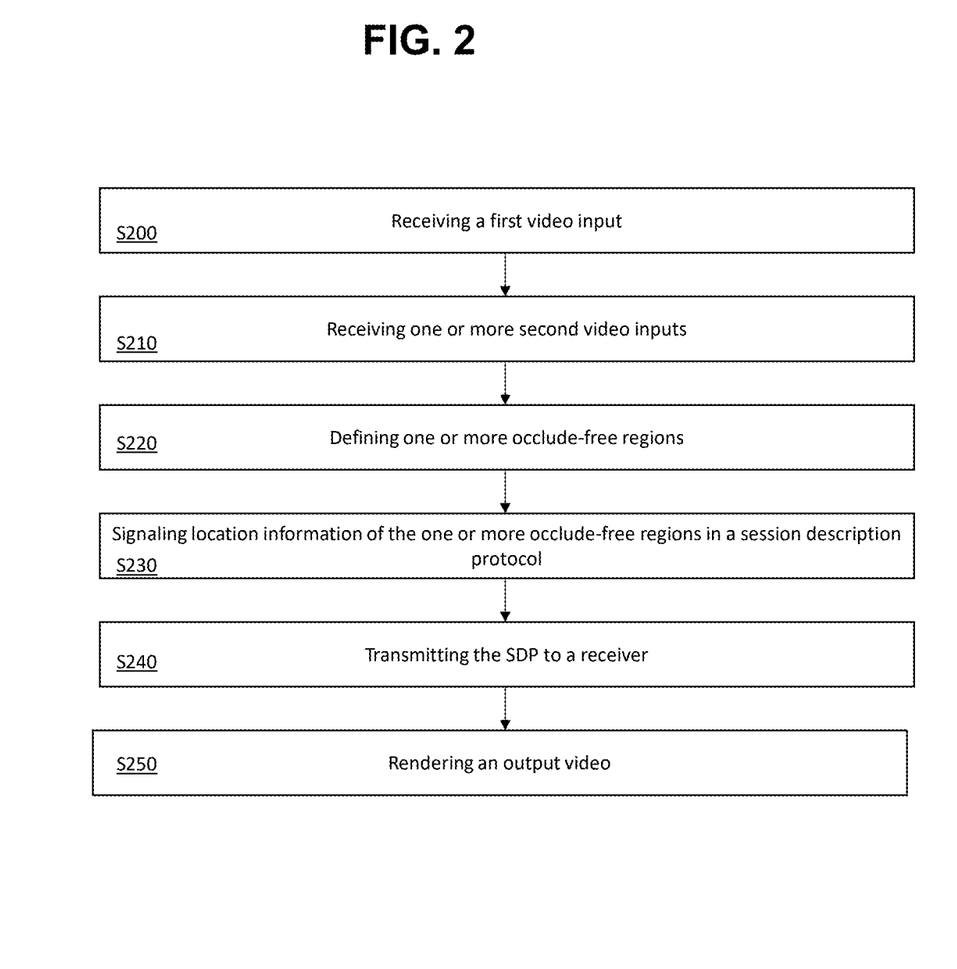
FIG. 2 is a flow chart of an example process for defining an occlude-free region, in accordance with various embodiments of the present disclosure.

FIG. 2 illustrates a flowchart of an example embodiment of a process of performing a video conferencing.

As shown in FIG. 2 the process may include receiving a first video input corresponding to a 360-degree video conference.

As further shown in FIG. 2 the process may include receiving one or more second video inputs.

As further shown in FIG. 2 the process may include defining one or more occlude-free regions in the first video input. The occlude-free regions indicate areas of the video that are not overlapped by any image or video.

As further shown in FIG. 2 the process may include signaling location information of the one or more occlude-free regions in a session description protocol via a 3GPP overlay attribute.

As further shown in FIG. 2 the process may include transmitting the SDP to a receiver.

As further shown in FIG. 2 the process may include rendering an output video that includes the first video input with the one or more second video inputs overlaid in a region not including the one or more occlude free regions.

Figure 3:
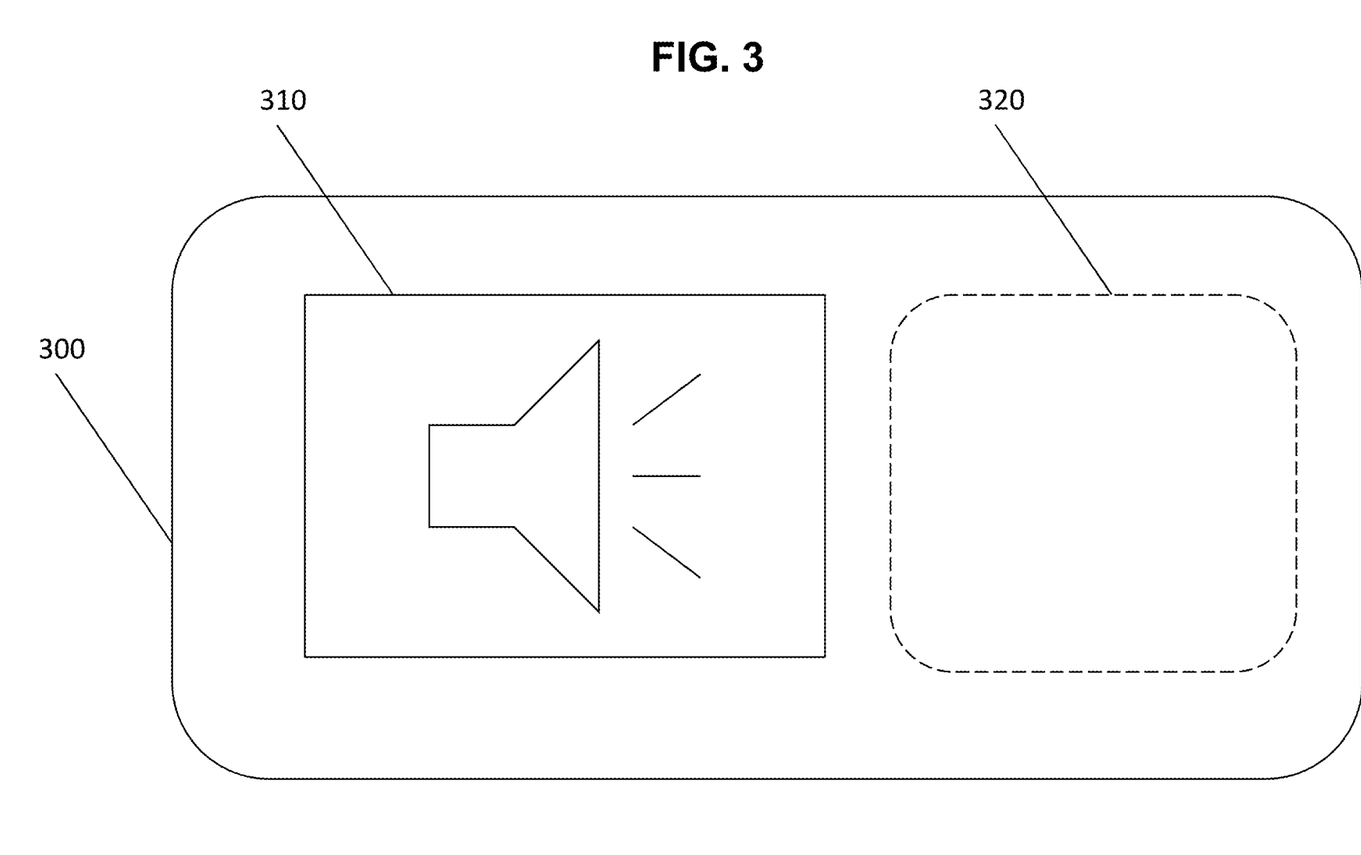
FIG. 3 is a diagram of the occlude-free and occluded regions in accordance with various embodiments of the present disclosure.

FIG. 3 illustrates an embodiment of an occluded region 320 and occlude-free region 310. On a screen 300, the space may be allocated for either an occlude-free region 310 or an occluded region 320. An occlude-free region 310 is a region of the screen 300 where content or other information is being drawn/rendered or otherwise outputted to. This occlude-free region 310 may not have other content rendered on top of or otherwise overlapped. Meanwhile, occluded region 320, is free of content, has low priority content, or has been marked as an region that may have other content placed over it. An occlude-free region is defined by its location in that coordinate system and its region in that coordinate system. For instance, a spherical rectangular region is defined by its center, and its yaw and pitch range around the center. Similarly, in various coordinate systems, a region may be defined using the parameters of that coordinate system. In some embodiments, regions of a screen 300, whole screens or plurality of screens may be marked as either occluded or occlude-free regions.

Various mechanisms may be used for signaling an occlude-free region. For example, in some embodiments the signaling an occlude-free region may be sending the coordinate of such region as an item in the list of occlude-free regions as part of the session description. In other embodiments, signaling an occlude-free region may be done by defining a node in scene description that defines the occlude-free region and its property (e.g., being transparent and does not contain any media objects). In other embodiments, signaling an occlude-free region may be performed by defining a separate scene description that only defines the collude-free regions. An occlude-free region of a 360 video may be signaled in the SDP a=3gpp_occludefree attribute. The video component may have the location and size (range) of the region. Since the component is defined by 3gpp_occludefree, the ITT4RT knows that this signaling doesn't contain any actual media, but is used for signaling the region that should not be covered.

In some embodiments, the scene description may include a node for each occlude-free region. The node texture properties may be set to an alpha channel with an opacity of 0 (complete transparency). Alternatively, a new MIME type may be defined for occlude-free nodes. For example, in the glTF scene description, if for a texture the alphaMode=MASK, and alphaCutOff=1.1, then the object is transparent (not rendered). A new attribute may be added to the glTF specification to explicitly signal these regions as occlude free region.

Figure 4:
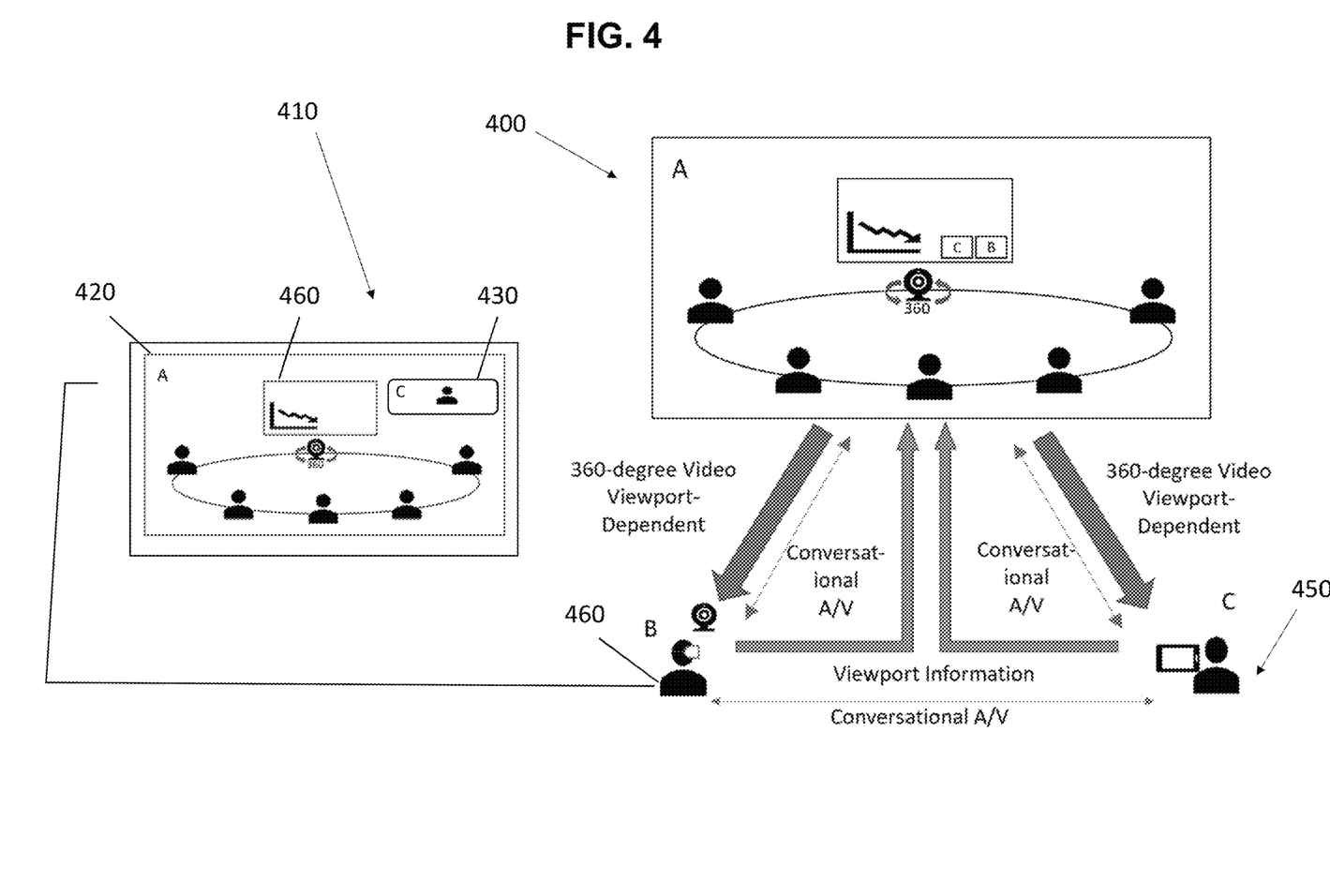
FIG. 4 is a diagram of the 360 video system in accordance with various embodiments of the present disclosure.

FIG. 4 details an embodiment of the 360 video system in use. In the exemplary embodiment, a 360 video presentation is being conducted. The video presentation, for example, may be a video conference, a video chat, a video or other information exchange where visual and audio information is present. In this embodiment, user B 460, receives a 360 video from user A 400 and a 2-d video from user C 450. The user may want to see both videos on his/her terminal. However, if the user wants to take the most advantage of the device display, room A's 360-video may need to take the entire screen of user B's device, and then, the 2-d video from user C must be overlaid on top of room A 400's 360-video. In this embodiment, User B's 460 video feed 420 is a combination of user's A video 400 as the background, which then has occlude-free and occluded regions defined. These regions of user's A video 400 are transmitted from a sender to a receiver or shared through other software solutions or devices. Here, user B 460 sends their video information to user C 450 and user A 400. Additionally, User A 400 and User C 450 send each of their individual video information between themselves and to User B 460. The occlude-free regions may be described with a separate scene description object than a regular scene description. This additional scene description only contains information about occlude-free regions and therefore is not used for rendering, but provides a map for occlude-free regions.

After receiving information about the other user's video display, the regions are defined as occluded or occlude-free, and then a combination of two is rendered on user B's screen 410. User B's screen 410, shown in FIG. 4, uses users A's video 400 as a background with at least one region marked as occlude-free region 460 and another region marked as occluded region 430. In FIG. 4, the occluded region 430 has user C's video 440 drawn on the region. In some cases, the arrangement of one or more of the screens may need to change because of new information, such as additional users, more presentation information being drawn or for example, a user becoming the focal point or otherwise requiring more screen real estate. With the additional information, each user's screen will require that the occluded or occlude-free regions be redefined to change and account for the changing circumstances. For example, referring to FIG. 4, if an additional user were to join in the presentation, all the user's present screens would have to redefine the occluded or occlude-free regions and re-render each of the user's screen to ensure that key information is not occluded.

Figure 5:
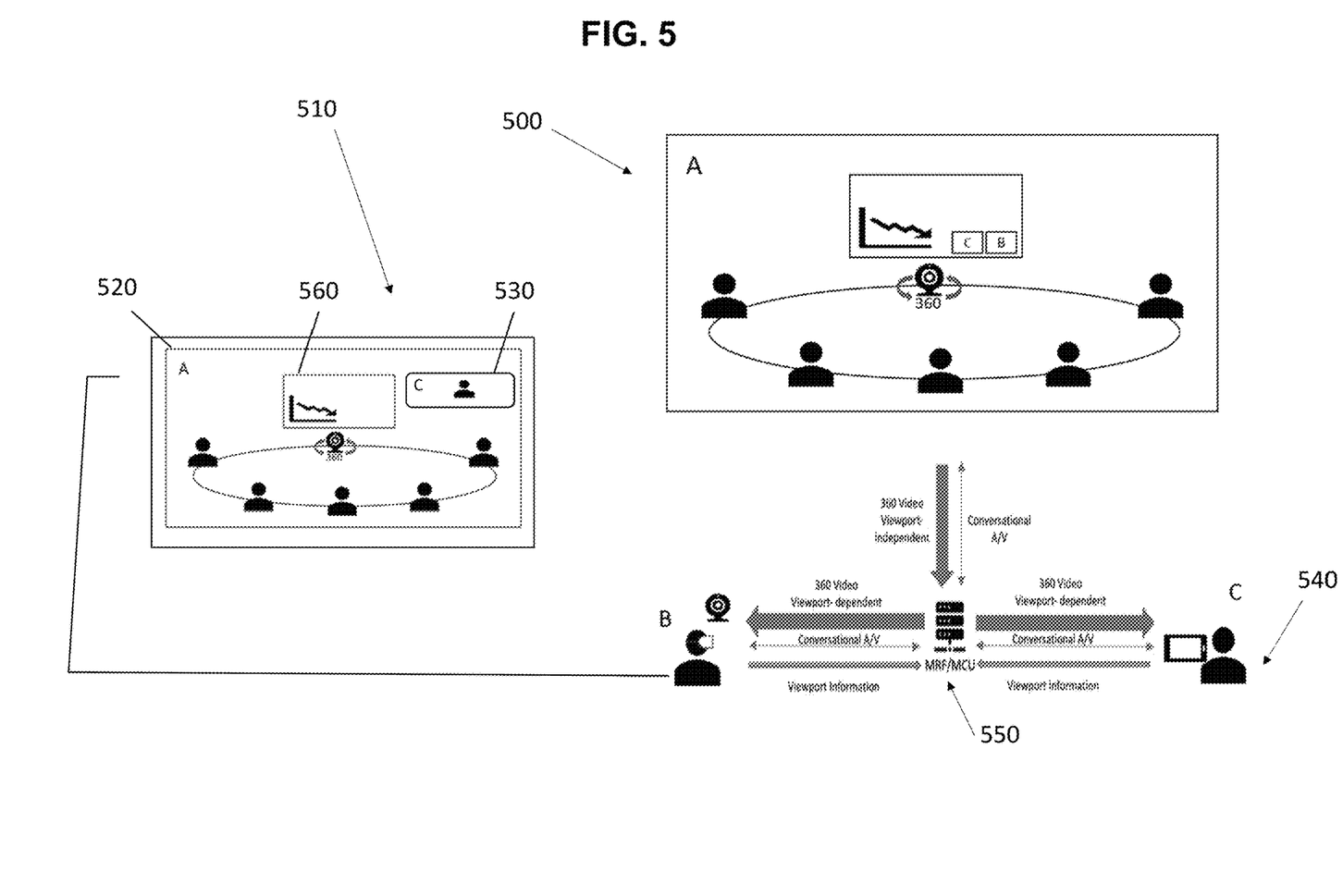
FIG. 5 is a diagram of the 360 video system in accordance with various embodiments of the present disclosure.

FIG. 5 details an embodiment of the 360 video system in use. In the exemplary embodiment, a 360 video presentation is being conducted. The video presentation, for example, may be a video conference, a video chat, a video or other information exchange where visual and audio information is present. In this embodiment, user B 460, receives a 360 video from user A 500 and a 2-d video from user C 540. The user may want to see both videos on his/her terminal. However, if the user wants to take the most advantage of the device display, room A's 360-video may need to take the entire screen of user B's device, and then, the 2-d video from user C must be overlaid on top of room A's 360-video. In this embodiment, User B's video feed 520 is a combination of user's A video 500 as the background, which then has occlude-free and occluded regions defined. These regions of user's A video 500 are transmitted from a sender to a receiver through an MRF 550, or shared through other software solutions or devices. The MRF 550 may be used to create a single scene description for a conversational session. This scene description describes the overall scene to each remote client. The same scene description optionally may include additional nodes to signal the occlude-free regions, or it may include a separate root node that only contains the nodes for occlude-free regions.

Here, user B sends their video information to user C and user A. Additionally, User A and User C send each of their individual video information between themselves and to User B. The occlude-free regions may be described with a separate scene description object than a regular scene description. This additional scene description only contains information about occlude-free regions and therefore, is not used for rendering, but provides a map for occlude-free regions.

After receiving information about the other user's video display, the regions are defined as occluded or occlude-free then a combination of two is rendered on user B's screen 510. User B's screen 510, shown in FIG. 5, uses users A's video 500 as a background with at least one region marked as an occlude-free region 560 and another marked as occluded region 530. In FIG. 5, the occluded region 530 has user C's video 440 drawn on the region. In some cases, the arrangement of one or more of the screens may need to change because of new information, such as additional users, more presentation information being drawn or for example, a user becoming the focal point or otherwise requiring more screen real estate. With the additional information, each user's screen will require that the occluded or occlude-free regions be redefined to change and account for the changing circumstances. For example, using FIG. 5, if an additional user were to join in the presentation, the screens of all user's present would have to redefine the occluded or occlude-free regions and re-render each of the user's screen to ensure that key information is not occluded.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local region network, a wide region network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local region network (LAN) or a wide region network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, implement the operations specified in the flowchart and/or block diagram block or blocks. These computer readable program instructions may also be stored in a computer readable storage medium that may direct a computer, a programmable data processing apparatus, and/or other devices to operate in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the operations specified in the flowchart and/or block diagram block or blocks.

The flowchart and block diagrams in the figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical operation(s). The method, computer system, and computer readable medium may include additional blocks, fewer blocks, different blocks, or differently arranged blocks than those depicted in the Figures. In some alternative implementations, the operations noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified operations or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for video decoding in a decoder, the method comprising:
   receiving a first video input corresponding to a 360-degree video;
   receiving one or more second video inputs;
   determining one or more occlude-free regions in the first video input, each occlude-free region indicating an area of the video that is not overlayed by another image or video by location information of the one or more occlude-free regions in a session description protocol (SDP) via a 3rd Generation Partnership Project (3GPP) overlay attribute, wherein the 3GPP overlay attribute indicates whether a respective 3GPP overlay is intended for a occlude-free area or dedicated to a specific overlay and is indicated in the SDP according to a syntax of a=3gpp_overlay: overlay_id SP type SP (sphere_relative_overlay_config/viewport_relative_overlay_config)[SP overlay_info][for_additional_overlays]; and
   rendering an output video that includes the first video input with the one or more second video inputs overlaid in a region not including the one or more occlude-free regions.

2. The method according to claim 1, wherein the location information of each occlude-free region is based on a location of a respective occlude-free region in a coordinate system.

3. The method according to claim 1, wherein the one or more second video inputs is a 360-degree video or a 2-D video.

4. The method according to claim 1, wherein each occlude-free region is configured to by updated by any of:
   removing or adding new occlude-free regions during a session; and
   offering one or more new SDP lines during the session.

5. The method according to claim 4, wherein the size of each of each occlude-free region is configured to be updated.

6. The method according to claim 1, wherein whether a selected 3GPP overlay attribute is intended for an occlude-free region or whether the decided 3GPP overlay is dedicated to a specific overlay is indicated in the SDP by a flag.

7. The method according to claim 6, wherein rendering in the output video depends on the flag and an update in the SDP.

8. A method for video encoding, the method comprising:
   receiving a first video input corresponding to a 360-degree video;
   receiving one or more second video inputs;
   determining one or more occlude-free regions in the first video input, each occlude-free region indicating an area of the video that is not overlayed by another image or video by location information of the one or more occlude-free regions in a session description protocol (SDP) via a 3rd Generation Partnership Project (3GPP) overlay attribute, wherein the 3GPP overlay attribute indicates whether a respective 3GPP overlay is intended for a occlude-free area or dedicated to a specific overlay and is indicated in the SDP according to a syntax of a=3gpp_overlay: overlay_id SP type SP (sphere_relative_overlay_config/viewport_relative_overlay_config)[SP overlay_info][for_additional_overlays]; and encoding video data of one or more of first video input with the one or more second video inputs indicated by the 3GPP overlay as to be overlaid in a region not including the one or more occlude-free regions.

9. The method according to claim 8, wherein the location information of each occlude-free region is based on a location of a respective occlude-free region in a coordinate system.

10. The method according to claim 8, wherein the one or more second video inputs is a 360-degree video or a 2-D video.

11. The method according to claim 8, further comprising updating each occlude-free region in the SDP, wherein updating each occlude-free region comprises:
removing or adding new occlude-free regions during a session; and
offering one or more new SDP lines during the session.

12. The method according to claim 11, wherein the size of each of each occlude-free region is updated.

13. The method according to claim 8, further comprising adding a flag to the SDP to signal whether a selected 3GPP overlay attribute is intended for an occlude-free region or whether the decided 3GPP overlay is dedicated to a specific overlay.

14. The method according to claim 13, wherein in response to an updating in the SDP, indicating a change in a rendering in the output video.

15. A method of processing visual media data, the method comprising:

performing a conversion between a visual media file and a bitstream of a visual media data according to a format rule, the format rule indicating, for a first video input corresponding to a 360-degree video and one or more second video inputs, to:
determine one or more occlude-free regions in the first video input, each occlude-free region indicating an area of the video that is not overlayed by another image or video by location information of the one or more occlude-free regions in a session description protocol (SDP) via a 3rd Generation Partnership Project (3GPP) overlay attribute, wherein the 3GPP overlay attribute indicates whether a respective 3GPP overlay is intended for a occlude-free area or dedicated to a specific overlay and is indicated in the SDP according to a syntax of a=3gpp_overlay: overlay_id SP type SP (sphere_relative_overlay_config/viewport_relative_overlay_config)[SP overlay_info][for_additional_overlays].

16. The method according to claim 1, wherein the location information of each occlude-free region is based on a location of a respective occlude-free region in a coordinate system.

17. The method according to claim 1, wherein the one or more second video inputs is a 360-degree video or a 2-D video.

18. The method according to claim 1, wherein the format rule further indicates to update each occlude-free region in the SDP, and updating each occlude-free region comprises:
removing or adding new occlude-free regions during a session; and
offering one or more new SDP lines during the session.

19. The method according to claim 4, wherein the format rule further indicates to update the size of each of each occlude-free region.

20. The method according to claim 1, wherein the format rule further indicates to add a flag to the SDP to signal whether a selected 3GPP overlay attribute is intended for an occlude-free region or whether the decided 3GPP overlay is dedicated to a specific overlay.

* * * * *